(No Model.) 2 Sheets—Sheet 1.
S. P. BABCOCK.
BRICK MACHINE.
No. 327,376. Patented Sept. 29, 1885.
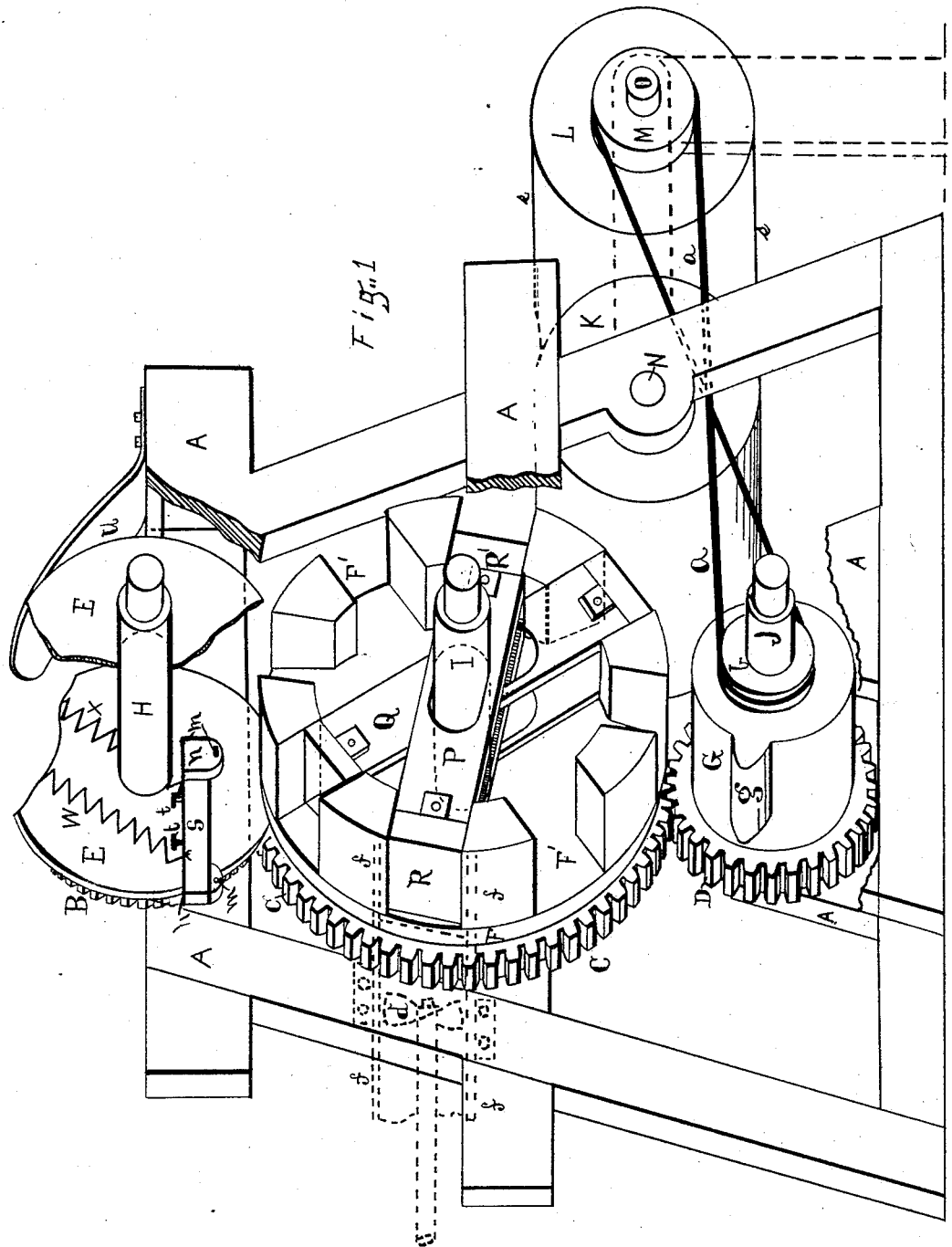
Witnesses:
Sumner Collins
James H. Brewster
Inventor:
S. P. Babcock
by Geo. H. Lothrop
Atty (No Model.) 2 Sheets—Sheet 2.

S. P. BABCOCK.
BRICK MACHINE.

No. 327,376. Patented Sept. 29, 1885.

Witnesses:
Sumner Collins
James H. Brewster

Inventor:
S. P. Babcock
by Geo. H. Lothrop
atty

UNITED STATES PATENT OFFICE.

SYLVESTER P. BABCOCK, OF ADRIAN, MICHIGAN, ASSIGNOR OF ONE-FOURTH TO JAMES R. HAIGHT, OF SAME PLACE.

BRICK-MACHINE.

SPECIFICATION forming part of Letters Patent No. 327,376, dated September 29, 1885.

Application filed February 12, 1885. (No model.)

*To all whom it may concern:*

Be it known that I, SYLVESTER P. BABCOCK, of Adrian, in the county of Lenawee and State of Michigan, have invented a new and useful Improvement in Brick-Machines, of which the following is a specification.

My invention consists in certain improvements in brick-machines hereinafter fully pointed out in the claims.

Figure 3:
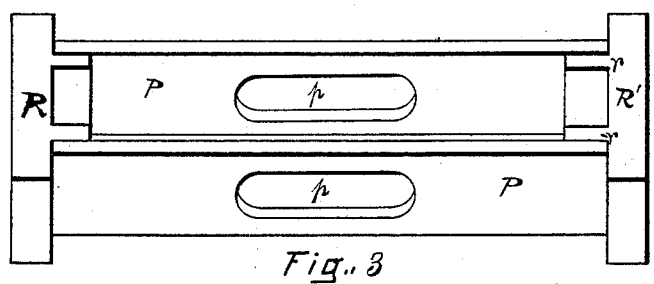
Figure 4:
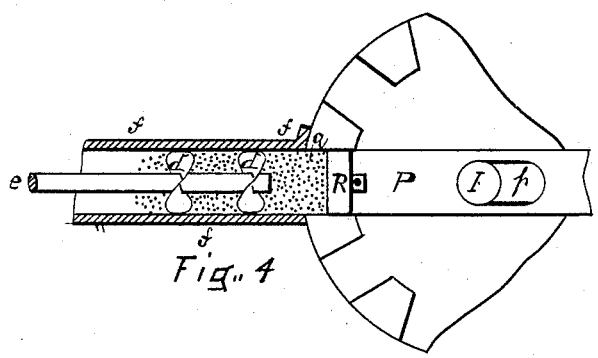
Figure 5:
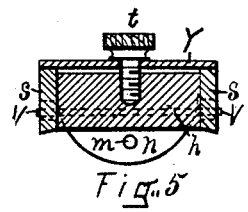
Figure 2:
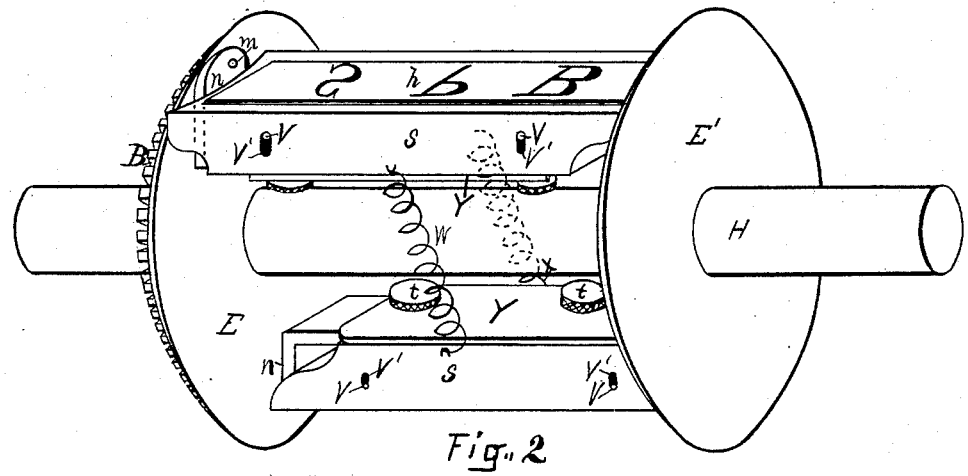

Figure 1 is a perspective of the machine with a portion of the frame and repressing mechanism broken away, and the feeding mechanism indicated in dotted lines. Fig. 2 is a perspective of the repressing mechanism. Fig. 3 is a perspective of one pair of plungers. Fig. 4 is an elevation of part of the mold-wheel with a vertical longitudinal section of part of the feeding mechanism. Fig. 5 is a vertical cross-section through one of the repressing-plungers.

A represents the frame of the machine.

I represents a shaft journaled in the frame and carrying a mold-wheel, F, having in its periphery and extending therethrough a number of molds, F' F'.

C represents a gear-wheel secured to one end of the mold-wheel.

R R represent plungers adapted to play closely in the molds, and said plungers are coupled in pairs by cross-bars P P, in each of which is an elongated slot, *p*, which surrounds shaft I. The cross-bars P P are secured to lugs *r r* on the inner faces of the plungers R R, and the length of said cross-bars is such that when one plunger R is at the bottom of the mold in which it plays the other plunger R of that pair will be flush with or project a little beyond the surface of the mold-wheel. The molds are arranged opposite each other in the mold-wheel, are even in number, and the cross-bars P P are attached to their plungers at different points in the length of the plungers, so that the cross-bars of one pair will lie between the cross-bars of another pair, as shown in Fig. 1.

H represents a shaft journaled in the frame of the machine directly over shaft I, and on it are secured two disks, E E, to one of which is secured a gear-wheel, B, which meshes with wheel C.

*h h* represent two plungers just large enough to enter the molds, having on their ends lugs *n n*, there being a space left between the face of the plunger and the lug, and the plungers are fastened to the disks E E by strong pins *m m*.

S represents a box or frame, which surrounds each plunger *h* on all sides but the top and bottom, as shown in Figs. 2 and 5. The face of the box S is made to fit the periphery of the mold-wheel, and the box is just large enough to surround one of the molds. The box S is secured to the plunger by pins V, which pass through the plunger and through slots V', cut through the sides of the box, so that the box can move on the plunger. The ends of box S lie between the face of the plunger and the lugs *n n*.

Y represents a strong plate-spring, which extends across the upper side of the box, above the plunger *h*, and *t t* represent two set-screws, which pass through the spring Y and screw into the plunger, so that by screwing the set-screws into the plunger said screws will force the spring against the box S, and the effect of this is to hold the box firmly against the mold-wheel when the plunger is in the mold, and thus force the plungers to enter and leave the mold squarely, for so long as the concave face of the box is firmly pressed against the mold-wheel the plunger cannot rock in the mold. The box also serves to retain the clay in the mold when the plunger first enters the mold.

W X represent two spiral springs running from one box to the other, and serves to hold the faces of the plungers always toward the circumference of the disks E E, and also serve to prevent the plunger which is in one of the molds from rocking therein, for while one plunger is at work the opposite plunger *h* is at the upper part of its revolution, and comes in contact with the under side of a plate-spring, U, the end of which is horizontal, so that it holds the upper plunger *h* level, and this tends, through said springs W X, to hold the lower one level.

When it is desired to stamp any letters or figures on the face of the bricks, such letters or figures may be raised or sunk on the face of the repressing-plungers h h, as shown in Fig. 2. As there are eight molds and only two repressing-plungers h shown in the drawings, it is evident that wheels B C must be so proportioned that wheel B will revolve four times as fast as wheel C, and any mechanic will understand how to change the proportion of these wheels to compensate for any change in the number of molds or repressing-plungers.

J represents a shaft journaled in the frame under shaft I, and it carries a drum, G, upon which is one or more cams, g, adapted to enter each mold in succession and press against the plunger R in said mold. The drum G is driven by a gear-wheel, D, secured thereto and driven by wheel C, and the wheels C D must be proportioned as above explained for wheels B C. I prefer to so proportion the molds and cams that wheel D will revolve twice as fast as wheel D.

K L represent rollers hung on shafts J O, and carrying thereon an endless belt, k, which is operated by a belt, a, running from a pulley, b, on shaft J, over a pulley, M, on shaft O. The roller K is close to the periphery of the mold-wheel, so that when a brick is pressed out of one of the molds above the roller it will be caught on the endless belt k.

f represents a portion of an ordinary horizontal pug-mill, in which is a grinding and auger shaft, e, carrying augers d, and the mouth of the pug-mill is about the same size horizontally as and a little larger vertically than the mold F, and is provided with an upwardly-extending lip, which bears against the periphery of the mold-wheel and serves to scrape off any superfluous clay that adheres to the wheel. q represents a mass of clay in the pug-mill.

The machine is driven by power from any suitable source applied to the shaft I, and I prefer to drive the auger-shaft of the pug-mill by putting a miter gear-wheel on the end of said shaft and a bevel gear-wheel on the end of shaft I, and connecting said gear-wheels by a shaft carrying a miter gear-wheel at one end and a bevel gear-wheel at the other end.

The operation of my machine is as follows: The machine is started and clay supplied to the pug-mill. As the auger-shaft forces the clay toward the mold-wheel, the molds are filled with clay as they successively come opposite the mouth of the pug-mill, and the clay is forced into said molds with considerable pressure. The plunger R retreats to the bottom of the mold as the same is filled with clay until its motion is arrested by the end of the slots p p in its cross-bars P P coming in contact with shaft I. As the mold-wheel revolves the filled mold is met by one of the plungers h, which enters the mold and represses the brick formed therein, and at the same time the cam g enters the opposite mold and presses on the plunger R, holding the plunger R up to the repressing-plunger. This relieves the shaft I from undue strain. At the time the repressing-plunger begins to enter the mold the box or frame S, which surrounds said plunger, is pressed firmly against the mold-wheel by the spring Y, and prevents the escape of clay from the mold, and also prevents the repressing-plunger h from rocking in the mold. As wheel F continues to revolve the repressing-plunger and cam g leave the mold where they have been at work, and the opposite mold, in which is the plunger R, comes opposite the pug-mill. Plunger R is at the surface of the mold-wheel, and the stream of clay presses against it and forces it to the bottom of its mold, at the same time forcing the opposite plunger R out of its mold, so that the brick contained in said mold is caught on the belt k and carried away from the machine. Each opposite pair of plungers and molds operates in the same manner, so that the operation is continuous.

It is evident that a greater or less number of molds than I have shown may be used in this machine, so long as the molds are arranged in opposite pairs.

By this means of constructing the plungers R R and connecting them in pairs I obtain very long bearings for said plungers so that they will be steady and not rock or shake in the molds.

What I claim as my invention, and desire to secure by Letters Patent, is—

1. In a brick-machine, the combination of a repressing-wheel carrying one or more pivoted repressing-plungers with the mold-wheel having an even number of molds formed in the periphery thereof for the reception of the pivoted plungers on the repressing-wheel, and a plunger arranged in each mold and adapted to sustain the contents thereof against pressure, substantially as described.

2. In a brick-machine, the combination of a mold-wheel having an even number of molds formed in the periphery thereof, a plunger in each mold rigidly connected by cross-bars having elongated slots therein with the opposite plunger, a repressing-wheel rotating in contact with the mold-wheel and carrying thereon repressing-plungers adapted to enter said molds successively, and a rotating drum carrying thereon one or more cams adapted to successively enter the mold opposite the one occupied by the repressing-plunger, substantially as and for the purposes set forth.

3. In a brick-machine, the combination, with a mold-wheel having molds in its periphery arranged in pairs diametrically opposite to each other, of plungers operating in said molds, the cross-bar connected with each pair of plungers and having an elongated slot, and the shaft of the mold-wheel passing through said slot, substantially as described.

4. In combination with the mold-wheel F, having therein the molds F', and connected plungers R R, the repressing-wheel E, carrying the pivoted repressing-plungers h, each surrounded by the box S, and having thereon the spring Y and set-screws t t, substantially as shown and described.

5. The combination, in a brick-machine, of a rotating mold-wheel having molds formed in the periphery thereof with a repressing-wheel having repressing-plungers pivoted thereto, a box surrounding said repressing-plunger and adapted to fit closely around the mouth of each mold and guide the repressing-plunger, and a spring attached to said repressing-plunger and adapted to press said box closely against the mold-wheel, substantially as shown and described.

6. In combination with the mold-wheel F, the repressing-wheel E, having pivoted thereto the repressing-plungers $h\,h$, the connecting-springs W X, and the spring U, substantially as shown and described.

SYLVESTER P. BABCOCK.

Witnesses:
S. M. BABCOCK,
C. B. BOTHUM.